Dec. 21, 1954 A. G. BRISACK 2,697,375
STRESSED BLIND FASTENER
Filed Jan. 29, 1952
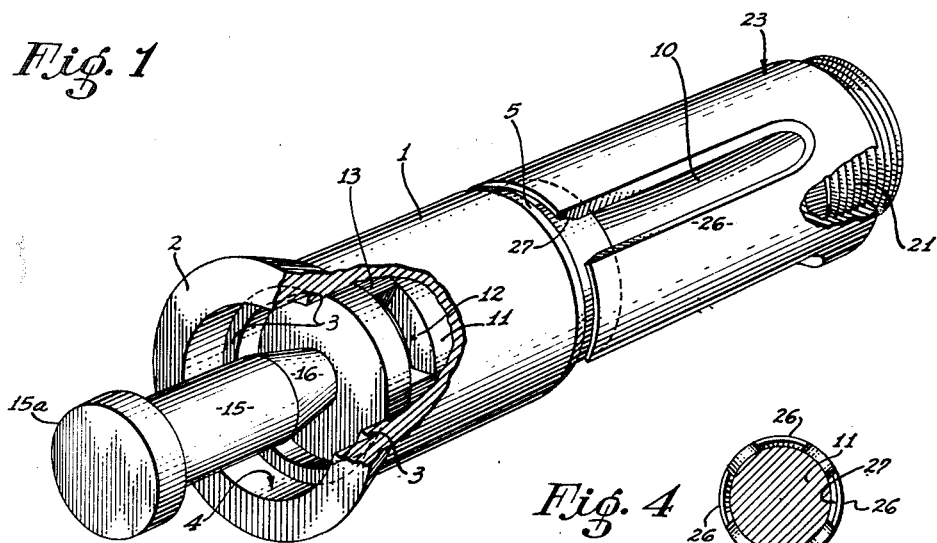
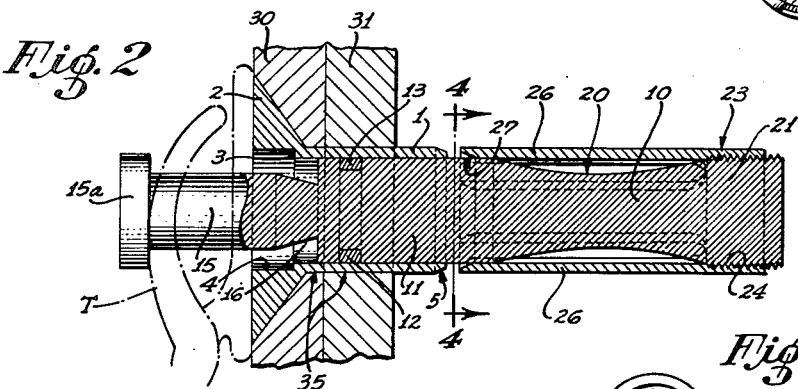
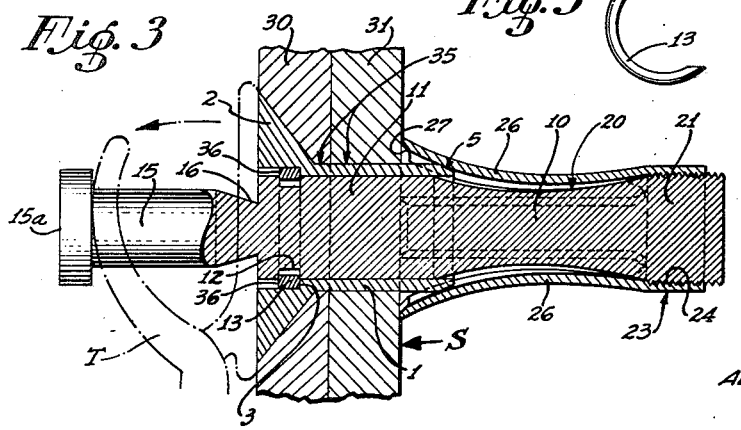
INVENTOR:
ALLEN G. BRISACK
HIS PATENT ATTORNEY

# United States Patent Office 2,697,375
Patented Dec. 21, 1954

2,697,375

STRESSED BLIND FASTENER

Allen G. Brisack, Torrance, Calif., assignor to Northrop Aircraft, Inc., Hawthorne, Calif., a corporation of California Application January 29, 1952, Serial No. 268,709

2 Claims. (Cl. 85—40)

My invention relates to blind fasteners of the kind comprising an outer headed sleeve adapted to be inserted through a hole in a plurality of sheets to be held together with the head of the sleeve bearing against the face of an outer sheet and its inner end projecting beyond the face of the innermost sheet, a shank longitudinally movable in said sleeve and projecting beyond the inner end thereof, and a resilient tubular member mounted on said projecting end of the shank and forced, upon movement of the inner end of the shank toward the head of the sleeve, to ride over the inner end of the sleeve into engagement with the face of an innermost sheet.

Among the objects of the present invention are:

To provide a blind fastener that can be snapped into a locked position in a workpiece.

To provide a blind fastener that is stressed in tension when in locked position.

To provide a blind fastener that is adjustable for tension stress prior to locking.

To provide a blind fastener adaptable for use in workpiece bores of varying length.

And to provide a novel quick acting blind fastener.

Briefly in one form, the fastener of the present invention includes a headed hollow sleeve in which a shank is slidable. On one end of the shank a snap ring is installed, and on the other end of the shank a member is attached having prongs extending toward the head of the sleeve. In use, after the assembled sleeve and shank have been inserted into a workpiece bore, the shank is moved outwardly to cause the prongs to move laterally and outwardly to contact the back of the workpiece and then to bend to place the shank under tension. As the desired tension is approached, the snap ring, confined by the inside of the sleeve, snaps outwardly over a shoulder at the sleeve head, locking the shank and sleeve together against the tension stress of the prongs. Thus, the workpiece is firmly held.

My invention will be more fully understood by reference to the drawings, in which:

Figure 1 is a perspective view of an assembled fastener in one preferred form.

Figure 2 is a longitudinal sectional view of the fastener of Figure 1 inserted in a workpiece.

Figure 3 is a longitudinal sectional view showing the fastener of Figure 2 in locked position.

Figure 4 is a cross sectional view taken as indicated by the line 4—4 in Figure 2.

Figure 5 is a top plan view of a snap ring used in the illustrated fastener.

Figure 6 is a side view of this snap ring.

Referring to the drawings, a hollow sleeve 1 is provided at one end with a head 2 having an inner shoulder 3 cut on the interior thereof to make the outer portion 4 of the head interior of larger diameter than the interior diameter of the sleeve 1. On the other end, the sleeve 1 is provided with an exterior bevel 5 sloping rearwardly and axially. This sleeve can be hardened for high shear strength for example.

A shank 10 is provided having a cylindrical portion 11 dimensioned to fit the interior of sleeve 1. In this cylindrical portion 11, a circumferential slot 12 is cut in which a snap ring 13 is positioned. This ring, shown particularly in Figures 5 and 6, extends around about 270° of the slot 12 and is shaped to have a normal diameter slightly larger than that of the cylindrical portion 11 of the shank 10, and is made of resilient material so that it can be sprung inwardly to permit the cylindrical portion 11 to move freely through the interior of the sleeve 1 with the snap ring 13 compressed in the groove 12.

Shank 10 is extended outwardly into a pull pin end 15, terminating in a flat circular head portion 15a having a diameter slightly smaller than the inside diameter of sleeve 1, and a narrowed break-off portion 16 at head level. If desired, the shank can also be hardened to reinforce the shear strength of the sleeve 1.

On the other end, the shank 10 is extended rearwardly from the cylindrical portion 11 first with reducing diameters, and then with expanding diameters to provide an inwardly coned roller type of periphery 20 terminating in a threaded end 21 as clearly shown in Figures 2 and 3.

A pronged sleeve 23 is provided with internal threads 24 at one end thereof, these threads cooperating with threaded end 21 of the shank 10 so that pronged sleeve 23 may be threaded thereon with a plurality, preferably four, of the separate prongs 26 extending forwardly. Each prong 26 is provided with a forward bevel 27 shaped to cooperate with headed sleeve bevel 5 to force the prongs 26 outwardly after these bevels 5 and 27 contact each other and are thereafter moved toward each other. Prongs 26 are preferably tempered to be resilient and springy. The diameter of pronged sleeve 23 is the same as the outside diameter of the body of headed sleeve 1.

In use, the shank 10, hollow sleeve 1 and prong sleeve 23 are first assembled as shown in Figures 1 and 2. The cylindrical portion 11 of the shank 10 is positioned in the interior of the headed sleeve 1 with the snap ring 13 compressed, and with prong sleeve 23 rotated on the threaded end 21 of the shank 10 in accordance with the thickness of the workpieces 30 and 31 to be fastened together as shown.

The assembled fastener is then pushed through aligned bores 35 in the workpieces 30 and 31 as shown in Figure 2, the bore in workpiece 30 being countersunk to receive head 2.

Pull pin 15 is then moved outwardly, as by the use of a tool T (shown in broken lines) which pries head 15a outwardly from the workpiece 30 so that the prongs 26 ride up over bevel 5 on the inside end of sleeve 1 and are forced outwardly. Further outward movement of shank 10 causes the ends of the prongs 26 to contact the rear surface S of the rear workpiece 31. Throughout this movement, snap ring 13 is confined by the interior of the body of headed sleeve 1.

After the ends of prongs 26 have contacted the workpiece surface 31, further outward pull is applied, thereby bending the prongs 26 inwardly into the space provided by the coned surface 20 of the shank 10, as best shown in Figure 3. The prongs 26, because of their spring action, tend to straighten and thus exert a constant tension on the shank 10. When a proper bow is attained on the prongs 26, the snap ring 13 passes off the interior of the headed sleeve 1 and moves outwardly over the shoulder 3 in the sleeve head 2, a portion however, remaining in groove 12. Thus the shank is locked to the head, with tension continuously being exerted by the bowed prongs 26 to force the workpieces together.

After the snap ring has moved outwardly, the pull pin 15 is broken off at the break off portion 16, leaving a flush head on the outside of the workpiece 30. The adjustment of prong sleeve 23 on shank 10 is readily made for workpieces of various thickness after observations of prong bow in test pieces of known thicknesses. In addition, the concavity of coned periphery 20 of the shank 10 is made sufficiently deep to take care of a reasonable latitude of prong bow where workpieces may vary slightly in thickness without requiring adjustment of prong sleeve 23 on shank 10.

It is to be noted that one advantage of the snap lock fastener described herein is that when the snap ring 13 reaches shoulder 3 on the pull-out, this ring snaps outwardly with a clear audible click, indicating to the operator that the fastener is securely locked. In addition, the interior diameter of the head outwardly of shoulder 3 is maintained to the outer surface of the head 2, providing an inspection space 36 through which the snap ring 13 can be easily seen when in locking position, so that an inspector can readily determine whether or not the ring 13 has moved outwardly to proper locking position.

It is also to be noted that the snap ring 13 as shown, is preferably provided with a small bevel 37 on the head side thereof as best shown in Figure 6, so that it can be readily compressed and inserted in headed sleeve 1 during assembly.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A blind fastener comprising: a headed sleeve having an enlargement in its interior diameter adjacent its head end, forming a flat outwardly-facing interior shoulder; a shank snugly slidable in said sleeve and projecting out of the other end thereof, said shank having a circumferential groove within said sleeve provided with a flat side wall facing opposite said shoulder; a second sleeve having an exterior diameter at least as small as that of said headed sleeve adjustably threaded onto the projecting end of said shank; a plurality of resilient prongs secured to and extending longitudinally from said second sleeve toward said other end of said headed sleeve, said latter sleeve end and the opposed ends of said prongs being cooperatively bevelled for expansion of said prongs by inter-engagement of said bevelled prong and sleeve ends on movement of said shank outwardly of said headed sleeve; and an expansible snap ring in said shank groove, said ring having flat opposite ends and being confined within said groove by said headed sleeve inwardly of said shoulder in the pre-installation assembled relative positions of said headed sleeve and said shank, said ring being partially expansible into said sleeve enlargement for locking engagement with said shoulder after said shank has moved a predetermined distance to expand said fingers.

2. The structure defined in claim 1, in which the sleeve interior enlargement extends to the head end of the sleeve and the maximum diameter of the shank is less than that of said enlargement, to form an annular gap between said shank and sleeve outwardly of said ring for visual inspection of the locking condition thereof.

References Cited in the file of this patent

UNITED STATES PATENTS

| Number | Name | Date |
| --- | --- | --- |
| 738,503 | Waters | Sept. 8, 1903 |
| 2,353,248 | Lamb | July 11, 1944 |
| 2,429,782 | Versoy | Oct. 28, 1947 |
| 2,516,554 | Coyne | July 25, 1950 |